(12) United States Patent
Reisswig et al.

(10) Patent No.: US 10,963,645 B2
(45) Date of Patent: Mar. 30, 2021

(54) BI-DIRECTIONAL CONTEXTUALIZED TEXT DESCRIPTION

(71) Applicant: SAP SE, Walldorf (DE)

(72) Inventors: Christian Reisswig, Berlin (DE); Darko Velkoski, Berlin (DE); Sohyeong Kim, Berlin (DE); Hung Tu Dinh, Berlin (DE); Faisal El Hussein, Berlin (DE)

(73) Assignee: SAP SE, Walldorf (DE)

( * ) Notice: Subject to any disclaimer, the term of this patent is extended or adjusted under 35 U.S.C. 154(b) by 288 days.

(21) Appl. No.: 16/270,328

(22) Filed: Feb. 7, 2019

(65) Prior Publication Data

US 2020/0258498 A1 Aug. 13, 2020

(51) Int. Cl.
*G06F 40/30* (2020.01)
*G10L 15/183* (2013.01)

(52) U.S. Cl.
CPC ............ *G06F 40/30* (2020.01); *G10L 15/183* (2013.01)

(58) Field of Classification Search
CPC ............................... G06F 40/30; G10L 15/183
USPC ......................................................... 704/243
See application file for complete search history.

(56) References Cited

U.S. PATENT DOCUMENTS

| | | | | |
|---|---|---|---|---|
| 10,812,449 | B1 * | 10/2020 | Cholleton | ............. G06F 40/126 |
| 2012/0233127 | A1 * | 9/2012 | Solmer | ............... G06F 16/3347 |
| | | | | 707/661 |
| 2014/0236578 | A1 * | 8/2014 | Malon | ..................... G06F 40/40 |
| | | | | 704/9 |
| 2018/0165554 | A1 * | 6/2018 | Zhang | .................. G06K 9/6256 |
| 2019/0087728 | A1 * | 3/2019 | Agarwal | ............. G06F 16/2455 |
| 2020/0257764 | A1 * | 8/2020 | Reisswig | .............. G06F 40/284 |
| 2020/0258498 | A1 * | 8/2020 | Reisswig | .............. G10L 15/183 |

OTHER PUBLICATIONS

Bao, Zuyi, et al. "Neural domain adaptation with contextualized character embedding for Chinese word segmentation." National CCF Conference on Natural Language Processing and Chinese Computing. Springer, Cham, 2017.*
"European Application Serial No. 19206110.9, Extended European Search Report dated May 14, 2020", 8 pgs.
"U.S. Appl. No. 16 275,025, Notice of Allowance dated Jan. 6, 2021", 7 pgs.

(Continued)

*Primary Examiner* — Edwin S Leland, III
(74) *Attorney, Agent, or Firm* — Schwegman Lundberg & Woessner, P.A.

(57) ABSTRACT

Various examples described herein are directed to systems and methods for analyzing text. A computing device may train an autoencoder language model using a plurality of language model training samples. The autoencoder language mode may comprise a first convolutional layer. Also, a first language model training sample of the plurality of language model training samples may comprise a first set of ordered strings comprising a masked string, a first string preceding the masked string in the first set of ordered strings, and a second string after the masked string in the first set of ordered strings. The computing device may generate a first feature vector using an input sample and the autoencoder language model. The computing device may also generate a descriptor of the input sample using a target model, the input sample, and the first feature vector.

20 Claims, 8 Drawing Sheets

(56) References Cited

OTHER PUBLICATIONS

Bojanowski, Piotr, "Enriching Word Vectors with Subword Information", ArXiv: 1607.04606v1, (Jul. 15, 2016), 7 pgs.
Botha, Jan, "Composition Morphology for Word Representations and Language Modelling", Proceedings of the 31st International Conference on Machine Learning, (2014), 9 pgs.
Miyamoto, Yasumasa, "Gated Word-Character Recurrent Language Model", arXiv:1606.01700v1, (Jun. 6, 2016), 5 pgs.
Wang, Zhilin, "Words of Characters? Fine-grained Gating for Reading Comprehension", arXiv:1611.01724v1, (Nov. 6, 2016), 10 pgs.
Abkik, Alan, et al., "Contextual String Embeddings for Sequence Labeling", Proceedings of the 27th International Conference on Computational Linguistics, (2018), 1638-1649.
Ackermann, Nils, "Introduction to ID Convolutional Neural Networks in Keras for Time Sequences", [Online]. Retrieved from the Internet: <URL: https://blog.goodaudience.com/introduction-to-1d-convolutional-neural-networks-in-keras-for-time-sequences-3a7ff801a2cf>, (Sep. 4, 2018), 8 pgs.
Dauphin, Yann A, et al,, "Language Modeling with Gated Convolutional Networks", Proceedings of the 34th International Conference on Machine Learning. arXiv: 1612.08083v3, (2017), 9 pgs.
Devlin, Jacob, et al., "BERT: Pre-training of Deep Bidirectional Transformers for Language Understanding", Google. arXiv:1810.04805v1, [Online]. Retrieved from the Internet: <URL: https://arxiv.org/abs/1810.04805>, (2018), 14 pgs.
Merity, Stephen, et al., "An Analysis of Neural Language Modeling at Multiple Scales", arXiv:1803.08240v1, (2018), 10 pgs.
Peters, Matthew, et al., "Deep contextualized word representations", Proceedings of NAACL-HLT, (2018), 2227-2237.
Radford, Alec, et al., "Improving Language Understaning Generative Pre-Training", (2018), 12 pgs.

\* cited by examiner

BI-DIRECTIONAL CONTEXTUALIZED TEXT DESCRIPTION

TECHNICAL FIELD

This document generally relates to methods and systems for use with computer devices, including networked computing devices. More particularly, this document relates to systems and methods for generating descriptors of text samples.

BACKGROUND

Natural language processing is an important way for human users to interface with computing devices. Traditionally, computing devices have been configured to receive input from human users in specialized formats and syntaxes. Natural language processing allows computing devices to understand words arranged according to the syntax of human languages. The nuances of human language, however, make natural language processing a technically challenging proposition.

BRIEF DESCRIPTION OF DRAWINGS

The present disclosure is illustrated by way of example, and not limitation, in the following figures.

DETAILED DESCRIPTION

Figure 1:
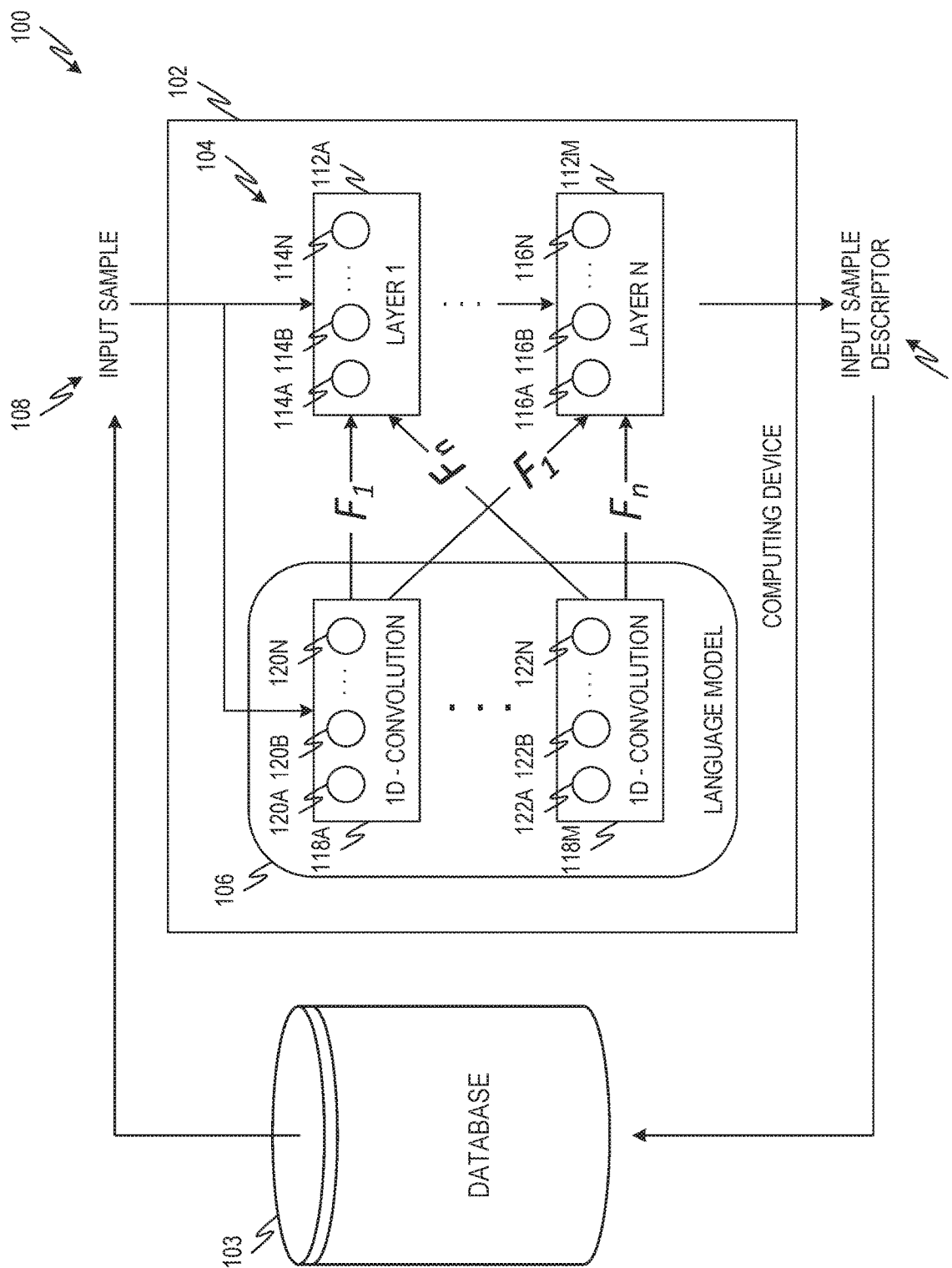
FIG. 1 is a diagram showing one example of an environment for performing natural language processing tasks.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Various examples described herein are directed to improving natural language processing using a target model and a bi-directional language model. Natural language processing tasks, such as key-value extraction, summarization, sentiment analysis, etc., include using a computing device to determine the meaning of a word or words arranged according to a human language. In human language, the meaning of a word or words often depends on the context in which the word is used. Consider the samples below:

Sample 1:
"She made a deposit to her bank account."
Sample 2:
"He sat down on the bank of the stream."

Both of these samples include an ordered set of strings. The word "bank" has different meanings in Samples 1 and 2. In Sample 1, the word "bank" refers to a financial institution. In Sample 2, the word "bank" refers to an area of land near a river or lake. The difference in meanings is discernable from the other strings in the sample. In the example of Samples 1 and 2, each string is a word, although in other examples strings can include numeric and/or other characters in addition to or instead of alphabetical characters.

When performing a natural language processing task, a computing device can account for the context of a string by using a target model in conjunction with a language model. The target model is used to execute a natural language processing task on an input sample that includes an ordered set of strings. The strings can include words, numbers, mixed alphanumeric strings, sub-words, characters, etc.

An input sample can be characterized at different levels, for example, based on the arrangement of the language model and/or target model. For example, an input sample for use with word level models can be characterized at the word level. When an input string is characterized at the word level, words in the string can be described by unique numbers. Accordingly, the input sample can be characterized as a sequence of numbers where each number denotes a word from a pre-existing vocabulary. An input sample for use with character level models can be characterized at a character level. When an input string is characterized at a character level, characters of the input sample can be described by unique numbers. Accordingly, the input sample can be characterized as a sequence of numbers where each number denotes a character from a finite set of characters. An input sample for use with sub-word level models can be characterized at a sub-word level. When an input sample is characterized at a sub-word level, sub-words (e.g., sets of characters making up less than all of a word) are described by unique numbers.

The language model is another model that is used generate one or more feature vectors based on input sample. The feature vector or vectors are indicative of the context of the input sample. The target model is used to perform the natural language processing task based on the input sample and on the one or more feature vectors.

In some examples, the language model is or includes a neural network or other layered model. For example, the language model may be implemented with a timber of layers. Each layer can include a set of nodes. An input sample is provided to the nodes of a first layer, which generate first layer outputs. The nodes of subsequent layers receive inputs from the nodes of the previous layer and provide outputs to the nodes of the next layer (if any). The output of the language model is given by the outputs of the nodes at the last layer. The outputs of a given layer form a feature vector. For example, the outputs of the nodes at a first layer can form a first feature vector. The outputs of the nodes at a second layer can form a second feature vector, and so on. These feature vectors can be provided as inputs to the target model, as described herein. Different nodes of the language model can correspond to different words, sub-words, or characters of the input sample. For example, the input sample may be characterized at the word level with each word provided to a different node at the respective layers. The input sample may be characterized at the character level with each character provided to a different node at the respective layers. The input sample may also be characterized at the sub-word level with each sub-word provided to a different node at the respective layers.

Some examples utilize a language model that is or includes an autoencoder, referred to herein as an autoencoder language model. An autoencoder language model is trained to reconstruct an input sample. For example, an autoencoder language model can be trained to predict the value of a subject string included in an input sample based on other strings in the input sample. For example, referring to Sample 1 above, the language model autoencoder can be programmed to return the string "bank" when provided with an input sample that includes the other strings of Sample 1 in the indicated order.

In some examples, an autoencoder language model can be or include a convolutional model, referred to herein as a convolutional autoencoder language model. A convolutional model includes one or more convolutional layers. A convolutional layer includes nodes that apply convolution to the respective node inputs. Nodes in a convolutional layer are associated with feature filters. A feature filter can include, for example, a vector or matrix. The feature filter for a node is convolved with the node input to generate the node's output. The node input can be or include the input sample and/or an output of one or more nodes at a preceding layer. In some examples, the language model autoencoder is fully convolutional, including only convolutional layers.

The convolution operation that occurs at the nodes of a convolutional autoencoder language model may consider all of the strings of an input sample, including the order of the strings. In this way, a convolutional autoencoder considers forward context (e.g., the strings preceding a subject string in the sample) as well as reverse context (e.g., the strings following the subject string in the sample) in a single operation. This may provide an improvement over language models that are implemented with sequential, unidirectional techniques. For example, a language model implemented with unidirectional techniques may require setting up and/or training both a forward model and a reverse model to consider both forward and reverse context. This can add complexity, increase required computing resources, and/or reduce speed during training and during use for natural language processing tasks.

In some examples, a convolutional autoencoder language model is trained using a denoising task. A training corpus includes training samples, where each training sample includes an ordered set of strings. One or more strings from the ordered set of strings can be masked by replacing the original characters of the string with randomly selected characters. Each character in the selected string may be replaced with a randomly selected character. In examples in which the models are arranged at a word level, the selecting string for scrambling may be a word. Also, in examples in which the models are arranged at a character level, each character in a selected word can be replaced with a randomly-selected character as described herein.

The resulting string can be referred to as a masked string or scrambled string. The convolutional autoencoder language model can be trained to reconstruct at least one masked string from the training samples based on the other, unmasked strings in the training samples. In this way, the convolutional autoencoder language model can be trained with unlabeled data in an unsupervised manner. Because of the masked strings, the model may be trained to infer from the context of neighboring strings how to reconstruct or fill in the masked strings. As a result, the feature vectors generated by the layers of the model may reflect the context of the input (e.g., forward and reverse context).

FIG. 1 is a diagram showing one example of an environment 100 for performing natural language processing tasks. The environment 100 includes a computing device 102. The computing device 102 can be or include any suitable type of computing device or network of devices including, for example, a desktop computer, a laptop computer, a tablet or other computing device, a server, etc. Example hardware and software architectures for implementing the computing device 102 are provided herein, for example, at FIGS. 7 and 8.

The computing device 102 executes a target model 104 and a language model 106. The language model 106 may be a convolutional autoencoder language model 106 and may be pre-trained to a denoising task utilizing an unlabeled corpus including masked training samples. Further details of an example denoising task for training the language model 106 are provided herein with respect to FIGS. 3 and 4.

The language model 106 includes layers 118A, 118M. Although two layers 118A, 118M are shown in FIG. 1, the language model 106, in some examples, includes additional layers. The layer 118A includes nodes 120A, 120B, 120N and the layer 118M includes nodes 122A, 122B, 122N. Nodes 120A, 120B, 120N may receive the input to the language model 106 as node inputs. Nodes 122A, 122B, 122N of the layer 118M may receive outputs of the nodes of the preceding layer as node inputs and may produce an output that is a reconstruction of the input. Although the layers 118A, 118M are shown with three respective nodes, layers 118A, 118M can include any suitable number of nodes.

Each node 120A, 120B, 120N, 122A, 122B, 122N may apply a feature filter to its node input. The feature filter includes a vector and/or matrix that is convolved with the respective node input to generate a respective node output. In some examples, the nodes 120A, 120B, 120N, 122A, 122B, 122N may apply centered kernel-n convolutions, where n, in some examples, is be greater than or equal to 3. In some examples, convolution at the nodes 120A, 120B, 120N, 122A, 122B, 122N is one dimensional. For example, nodes 120A, 120B, 120N, 122A, 122B, 122N may apply their respective feature filter in one direction only. Referring now to nodes 120A, 120B, 120N that receive an input sample 108, the nodes 120A, 120B, 120N, in some examples, are arranged to apply their respective feature filters sequentially to the strings of the input sample 108.

The outputs of the nodes at each respective layer 118A, 118M of the language model 106 can generate a feature vector $F_i$. For example, the node outputs of nodes 120A, 120B, 120N may generate a feature vector $F_l$ and the node outputs of the nodes 122A, 122B, 122N may generate a feature vector $F_n$. Feature vectors $F_i$, in some examples, include a sequence of vectors where each node at a given layer generates a vector. A linear combination of the feature vectors $F_i$ from the various layers 118A, 118M can be provided to the target model 104, given by Equation [1] below and described in more detail herein.

$$F_{context} = \Sum_i^n w_i F_i \quad [1]$$

In this example, $F_{context}$ is a combination of the feature vectors $F_i$ for each node from the respective layers 118A, 118M of the language model 106. The weight $w_i$ is a weight applied to the respective feature vectors $F_i$. In some examples, the respective weights $w_i$ are determined as a result of the training of the target model 104, as described herein.

The target model 104 is trained to perform a natural language processing task. Natural language processing tasks include tasks that determine the meaning of a word or group of words. One type of natural language processing task is key-value extraction. Key-value extraction involves detecting one or more strings in a sample that are of a particular type, indicated by a key. Consider an example key for "first names." Key-value extraction includes identifying strings from one or more samples that are first names. Consider another example key for "invoiced amount." Key-value extraction includes identifying strings from one or more samples, such as invoices or other business documents, that indicate an invoiced amount.

Another example natural language processing task is summarization. Summarization includes determining important information from a sample and generating an abridged version of the sample. Yet another example natural language processing task is sentiment analysis. Sentiment analysis includes analyzing a sample and determining the author's attitude or emotion as a whole and/or the author's attitude or emotion towards a particular topic or topics described by the sample.

The target model 104, in some examples, is a model including multiple layers 112A, 112M such as, for example, a neural network. Although two layers 112A, 112M are shown in FIG. 1, the target model 104 can include any suitable number of layers. The layers 112A, 112M of the target model 104 can include respective nodes 114A, 114B, 114N, 116A, 116B, 116N. Although FIG. 1 shows three nodes per layer 112A, 112M, the layers 112A, 112M can include any suitable number of nodes. The various layers 112A, 112M can include nodes that perform any suitable operation to generate an output, for example, depending on the type of natural language processing task performed. In some examples, one or more of the layers 112A, 112M are convolutional layers, recurrent unit layers, attention-based network layers, or any other suitable arrangement.

In the example of FIG. 1, the input sample 108 is provided to the target model 104 and to the language model 106. As described, the language model 106 generates feature vectors $F_1$ through $F_n$. The input sample 108 and a combination of the feature vectors $F_1$ through $F_n$ is provided to the nodes 114A, 114B, 114N of the first layer 112A of the target model. The combination of feature vectors $F_1$ through $F_n$ used at the nodes 114A, 114B, 114N at the first layer 112A may be provided by Equation [1] above and determined during training, as described herein. For example, different layers 112A, 112M can be trained to have different values of $w_i$. Each node 114A, 114B, 114N generates a node output that is provided as node inputs to the nodes of the next layer.

The nodes 116A, 116B, 116N receive the node outputs of the nodes of the preceding layer. For example, in a two-layer target model 104, the nodes 116A, 116B, 116N receive the node outputs of the nodes 114A, 114B, 114N. The node outputs of the nodes 116A, 116B, 116N are or indicate an input sample descriptor 110 that is a solution to the trained natural language processing task performed on the input sample 108. For example, when the trained natural language processing task is key-value extraction, the input sample descriptor 110 can indicate a key for some or all of the strings of the input sample 108. When the trained natural language processing task is summarization, the input sample descriptor 110 can indicate a summary of the input sample 108. In examples in which the trained natural language processing task is sentiment analysis, the input sample descriptor 110 can indicate a sentiment associated with some or all of the strings of the input sample 108.

Figure 2:
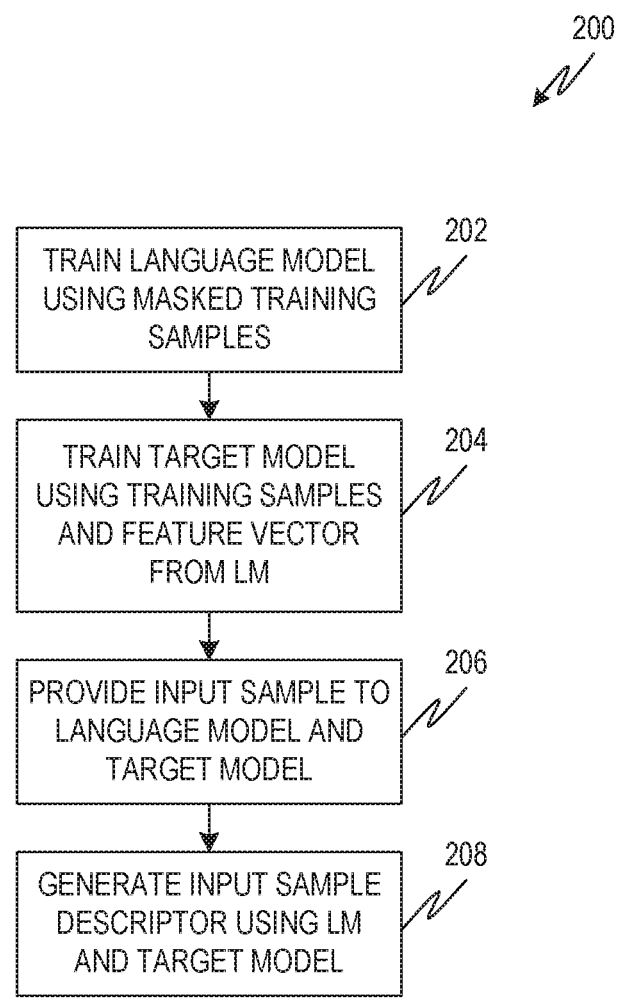
FIG. 2 is a flowchart showing one example of a process flow that can be executed by the computing device of FIG. 1 to execute a natural language processing task.

FIG. 2 is a flowchart showing one example of a process flow 200 that can be executed by the computing device 102 of FIG. 1 to execute a natural language processing task. At operation 202, the computing device 102 trains the language model 106, for example, using a denoising task. For example, the language model 106 can be trained using a language model training corpus that includes training samples. Training samples include an ordered set of strings. The computing device 102 is programmed to mask one or more strings of the ordered set of strings. For example, as described herein, when the language model 106 is arranged at a word level, one or more words may be masked. When the language model 106 is arranged at a character level, a complete word or string including a selected character may be masked. The language model 106 can be trained to correctly predict the original value of the masked string or strings. Additional details of an example for training the language model 106 using a denoising task are described herein with respect to FIGS. 3 and 4.

At operation 204, the computing device trains the target model 104 using a target model training corpus and feature vectors generated by the language model 106. For example, each layer 112A, 112M of the target model 104 can be provided with either a training sample from the training corpus (e.g., the first layer 112A) or the node outputs from the preceding layer. The training sample may also be provided to the now-trained language model 106. The language model 106 will, as a result, generate feature vectors $F_1$ through $F_n$. Each feature vector $F_1$ through $F_n$ is provided different layers 112A, 112B of the target model 104, for example, as illustrated in FIG. 1. The target model 104 can be trained to perform a desired natural language task such as key-value extraction, summarization, sentiment analysis, etc. Additional details of training the target model 104 are described herein with respect to FIG. 5.

At operation 206, the computing device accesses an input sample 108 and provides the input sample 108 to the trained target model 104 and the trained language model 106. The trained language model 106 provides feature vectors $F_1$ through $F_n$ to the target model 104, as described herein. Values for the feature vectors $F_1$ through $F_n$ are based on the input sample 108.

At operation 208, the target model generates an input sample descriptor 110 based on the input sample 108 and the feature vectors $F_1$ through $F_n$ provided by the language model 106. The type of input sample descriptor 110 may depend on the type of natural language processing task being performed. For example, if the natural language processing task is key-value extraction, the input sample descriptor 110 indicates keys, if any, associated with one or more strings of the input sample 108. If the natural language processing task is summarization, the input sample descriptor 110 can include a summary of the input sample 108. If the natural language processing task is sentiment analysis, then the input sample descriptor 110 can include an indication of sentiment associated with one or more strings of the input sample 108 and/or associated with the input sample 108 as a whole.

Figure 3:
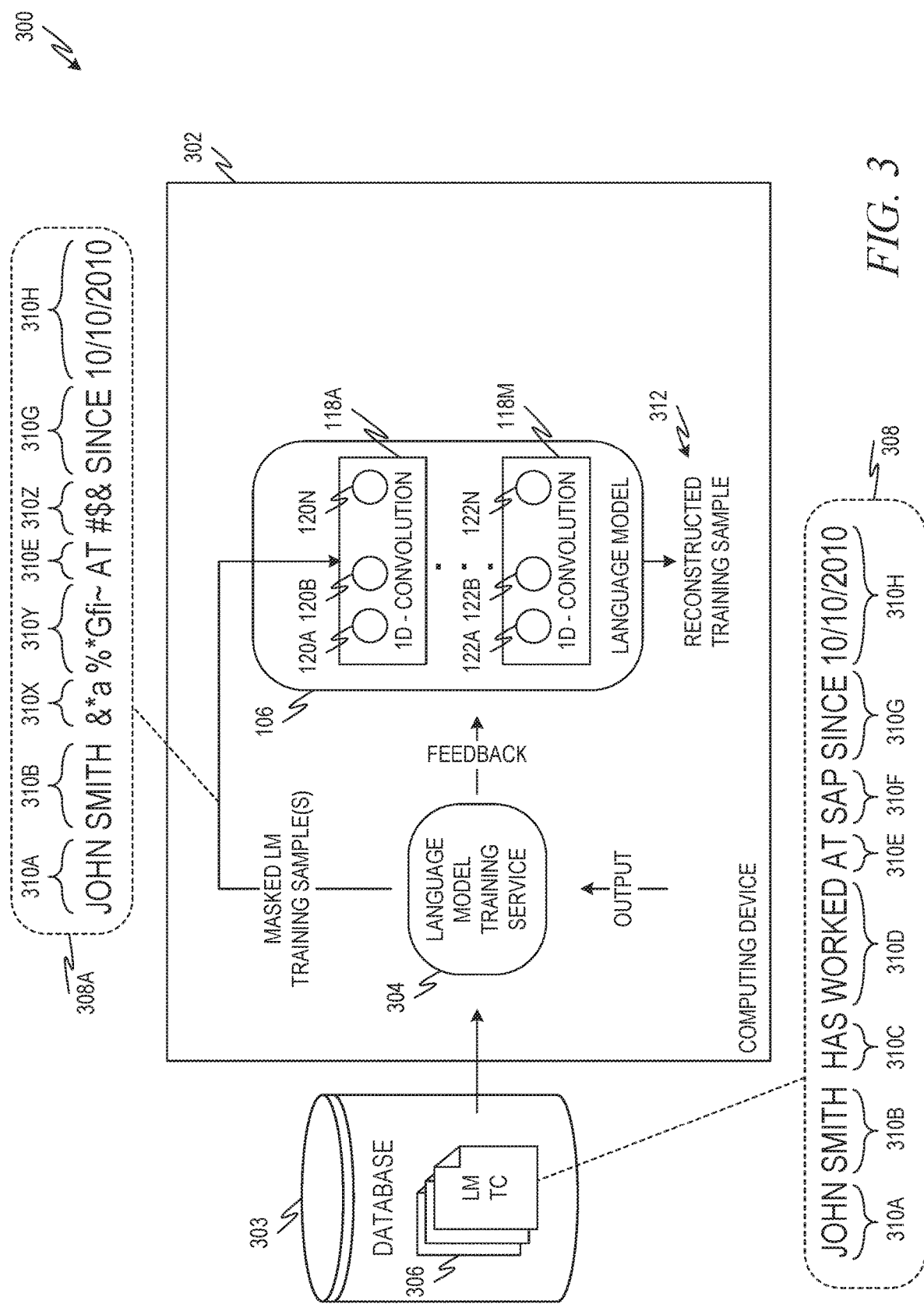
FIG. 3 is a diagram showing one example of an environment for training the language model of FIG. 1.

FIG. 3 is a diagram showing one example of an environment 300 for training the language model 106 of FIG. 1. The environment 300 includes a computing device 302 programmed to execute a language model training service 304. The computing device 302 can be or include any suitable type of computing device or network of devices including, for example, a desktop computer, a laptop computer, a tablet or other computing device, a server, etc. Example hardware and software architectures for implementing the computing device 302 are provided herein, for example, at FIGS. 7 and 8. In some examples, the computing device 302 that trains the language model 106 is the same computing device 102 that uses the language model in conjunction with the target model 104 to perform a natural language processing task.

Figure 4:
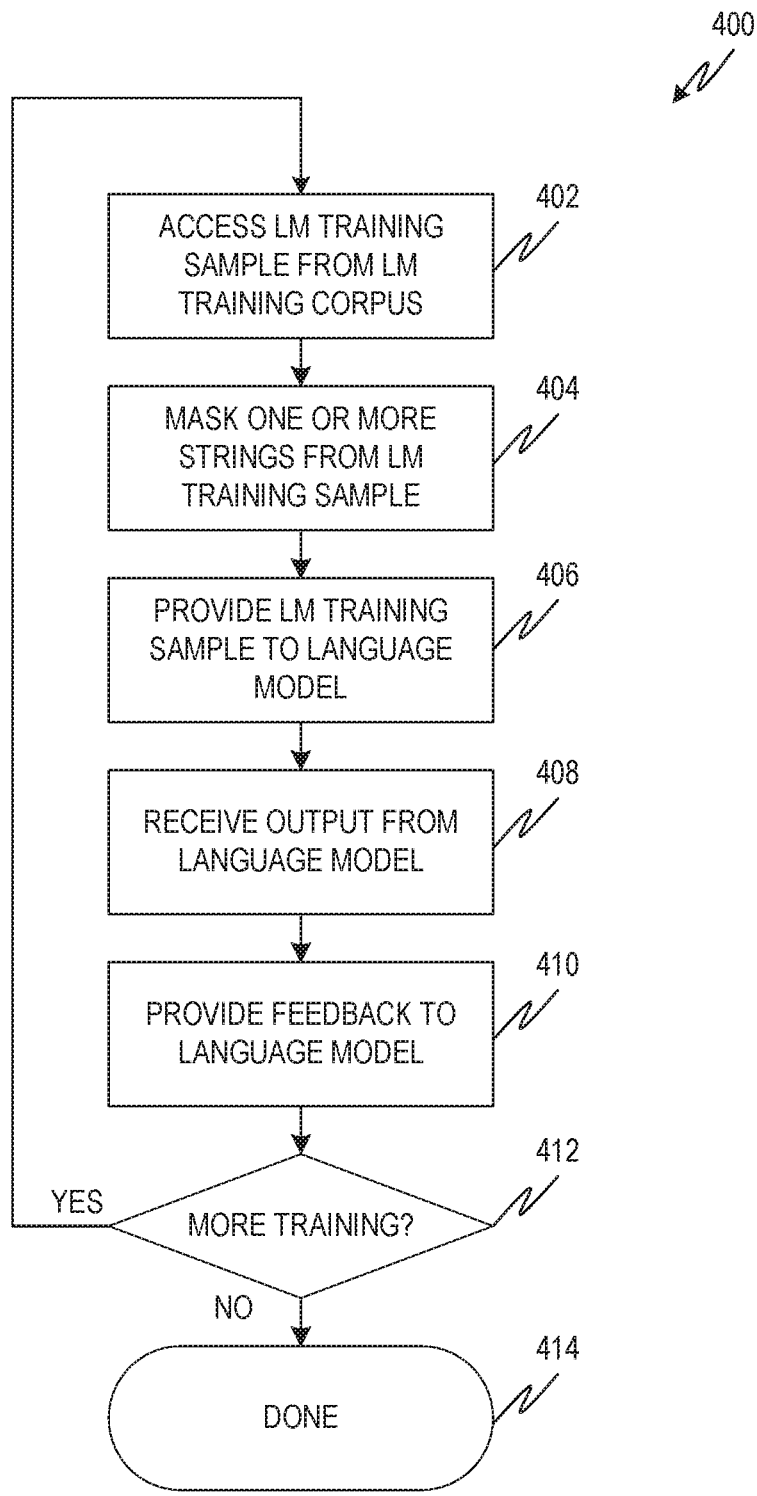
FIG. 4 is a flowchart showing one example of a process flow that can be executed by the computing device of FIG. 3 to train the language model of FIG. 1 using a denoising task.

The language model training service 304 is configured to train the language model 106 using a denoising task, as described herein. FIG. 4 is a flowchart showing one example of a process flow 400 that can be executed by the computing device 302 (e.g., the language model training service 304 thereof) to train the language model 106 using a denoising task. At operation 402, the language model training service 304 accesses a language model training sample, such as the example language model training sample 308, from a language model training corpus 306. The language model training corpus 306, in some examples, is unlabeled. For example, the samples of the language model training corpus 306 and/or the strings thereof may not be associated with metadata describing those samples and/or strings. In some examples, the language model training service 304 generates the language model training sample. For example, the language model training service 304 may select the next n strings from the language model training corpus 306, where the next n strings make up the language model training sample.

The example language model training sample 308 shown in FIG. 3 is an ordered set of strings 310A, 310B, 310C, 310D, 310E, 310F, 310G, 310H. In this example, the language model training corpus 306 may have included delineated training samples and/or the language model training service 304 may have generated the language model training sample 308 by selecting, in this example, the next eight strings from the language model training corpus 306.

At operation 404, the language model training service 304 masks one or more strings of the language model training sample to generate a masked language model training sample. Masking can include replacing a string with a random string and/or replacing the characters of the string with randomly-selected characters. In some examples, each character of the string is replaced individually. In the example of FIG. 3, the example language model training sample 308 has strings 310C, 310D, and 310F scrambled and/or masked to produce corresponding masked strings 310X, 310Y, 310Z. The example masked language model training sample 308A, then, includes the ordered set of strings 310A, 310B, 310X, 310Y, 310E, 310Z, 310G, 310H.

At operation 406, the training service 304 provides the masked language model training sample, such as masked language model training sample 308A, to the language model 106. The language model 106 processes the masked language model training sample 308A to generate a reconstructed language model training sample 312. The reconstructed language model training sample 312 is the language model's attempt to re-create the original training sample. At operation 408, the training service 304 receives the reconstructed training sample and compares it to the original unmasked language model training sample.

At operation 410, the training service 304 provides feedback to the language model 106 based on the comparison of the reconstructed training sample 312 and the original language model training sample. In some examples, the feedback includes modifications to the language model 106. For example, the training service 304 may modify a feature filter or filter feature filters applied by one or more of the nodes 120A, 120B, 120N, 122A, 122B, 122N. In some examples, the training service 304 utilizes a suitable back-propagation technique to translate a delta between the reconstructed training sample 312, and the original training sample into specific modifications to the feature filter or filters of the different nodes.

At operation 412, the training service 304 determines if more training is to be performed. Additional training may be performed, for example, if the language model 106 has an error rate that is greater than a threshold. If there is no additional training to be performed, the process may be completed at operation 414. If more training is to be performed, the training service accesses a next language model training sample at operation 402 and proceeds to utilize the next language model training sample as described herein.

Figure 5:
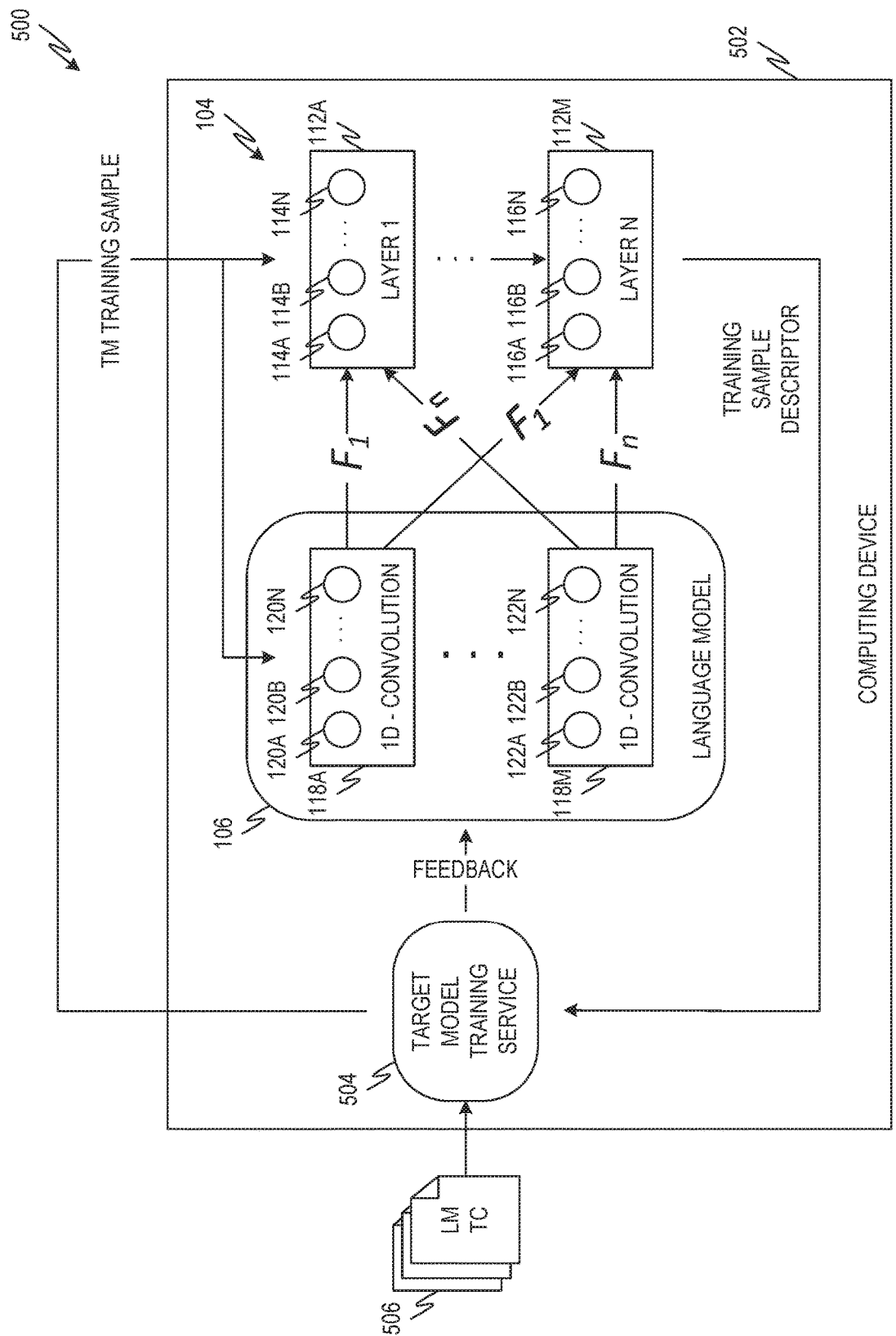
FIG. 5 is a diagram showing one example of an environment for training the target model of FIG. 1.

FIG. 5 is a diagram showing one example of an environment 500 for training the target model 104 of FIG. 1. The environment 500 includes a computing device 502 programmed to execute a target model training service 504. The computing device 502 can be or include any suitable type of computing device or network of devices including, for example, a desktop computer, a laptop computer, a tablet or other computing device, a server, etc. Example hardware and software architectures for implementing the computing device 502 are provided herein, for example, at FIGS. 7 and 8. In some examples, the computing device 502 that trains the target model 104 is the same computing device 102 that was used to train the language model 106 and/or the same computing device 302 that uses the target model 104 in conjunction with the language model 106 to perform a natural language processing task.

Figure 6:
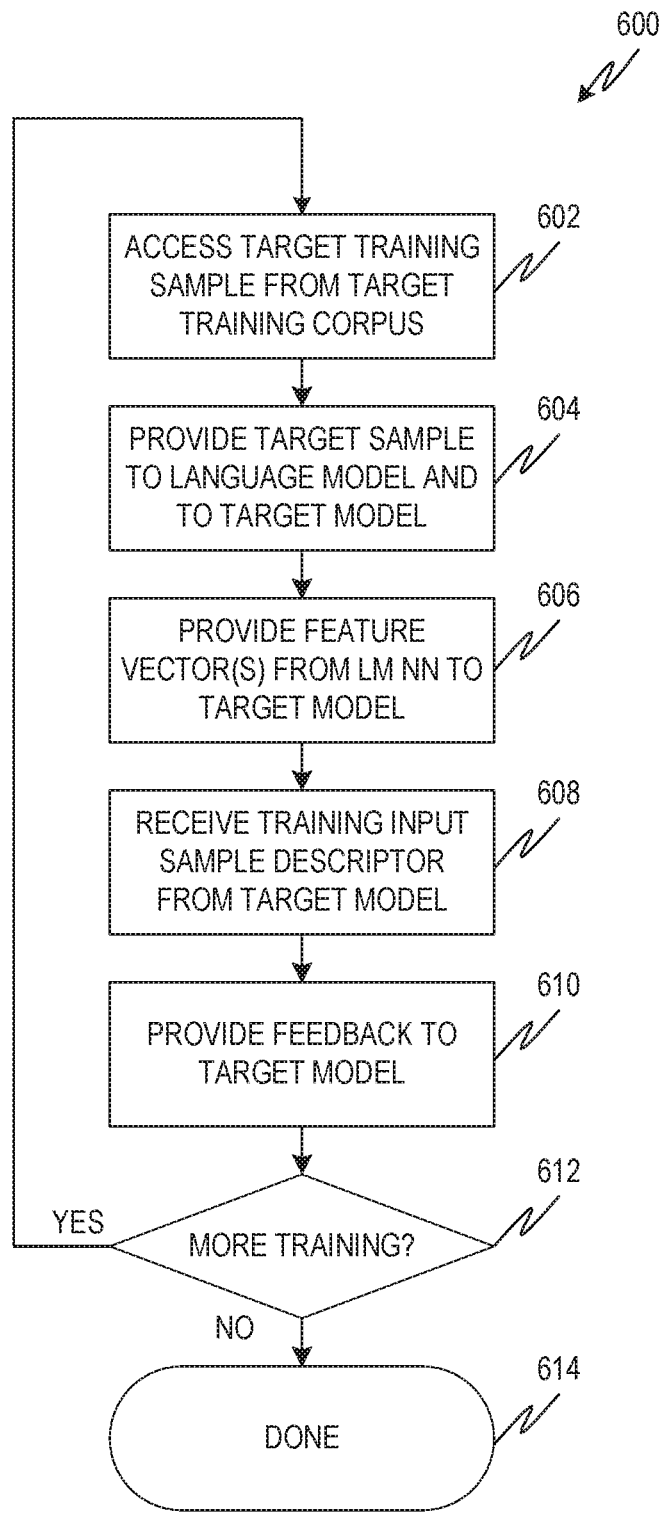
FIG. 6 is a flowchart showing one example of a process flow that can be executed by the computing device to train the target model of FIG. 1.

The target model training service 304 is configured to train the target model 104 in any suitable manner, for example, based on the natural language processing task to be performed by the target model. FIG. 6 is a flowchart showing one example of a process flow 600 that can be executed by the computing device 502 (e.g., the target model training service 504 thereof) to train the target model 104.

At operation 602, the target model training service 504 accesses a target model training sample from a target model training corpus 506. The target model training corpus 506, in some examples, includes labeled training samples. For example, a labeled training sample includes or is associated with a label indicating a training descriptor for the training sample. The training descriptor describes the correct result of the relevant natural language processing task for which the target model 104 is being trained. For example, when the target model 104 is being trained to perform key-value extracting, some or all of the training samples of the target model training corpus 506 are associated with labels indicating a key, if any, for the various strings of the training samples. In examples in which target model 104 is being trained to perform summarization, training samples may be associated with labels that indicate summaries of the respective training samples. In examples in which the target model 104 is being trained to perform sentiment analysis, the training samples may be associated with labels that indicate a sentiment association with one or more of the strings in the training sample and/or the training sample as a whole.

At operation 604, the target model training service 504 provides the target model training sample to the language model 106 and to the target model 104. For example, target model training sample is provided to a first layer 118A of the language model 106 and to a first layer 112A of the target model 104. At operation 606, the feature vectors $F_1$ through $F_n$ from the language model 106 to the layers 112A, 112M of the target model 104, for example, as described herein with respect to FIG. 1.

At operation 608, the target model training service 504 receives a training sample descriptor from the target model 104. The training sample descriptor is an output of the desired natural language processing task as performed on the target model training sample. For example, when the natural language processing task is key value extraction, the training sample descriptor can be a set of one or more keys describing the strings of the target model training sample. In other examples using the target model 104 to perform other natural language processing tasks, the training sample descriptor can have other values and/or forms as described herein.

At operation 610, the target model training service 504 provides feedback to the target model 104 based on the comparison of the training sample descriptor and the label associated with the target model training sample. In some examples, the feedback includes modifications to the target model 104. For example, the training service 504 may modify a characteristic of one or more of the nodes 114A, 114B, 114N, 116A, 116B, 116N of the layers 112A, 112M of the target model. Example node characteristics that can be modified include, for example, the weights applied to the respective feature vectors $F_1$ through $F_n$, for example, as shown by Equation [1] above. The training service 504 may utilize a suitable back-propagation technique to translate a delta between the training sample descriptor and the target model training sample label into specific modifications to the nodes 114A, 114B, 114N, 116A, 116B, 116N. At operation 612, the target model training service 504 determines if more training is to be performed. Additional training may be performed, for example, if the target model 104 has an error rate that is greater than a threshold. If there is no additional training to be performed, the process may be completed at operation 614. If more training is to be performed, the training service accesses a next target model training sample at operation 602 and proceeds to utilize the next target model training sample as described herein.

EXAMPLES

Example 1 is a computerized system for analyzing text, the computerized system comprising: at least one programmable processor; and a machine-readable medium having instructions stored thereon that, when executed by the at least one programmable processor, cause the at least one programmable processor to execute operations comprising: training an autoencoder language model using a plurality of language model training samples, the autoencoder language model comprising a first convolutional layer, wherein a first language model training sample of the plurality of language model training samples comprising a first set of ordered strings comprising a masked string, a first string preceding the masked string in the first set of ordered strings, and a second string after the masked string in the first set of ordered strings; generating a first feature vector using an input sample and the autoencoder language model; and generating a descriptor of the input sample using a target model, the input sample, and the first feature vector.

In Example 2, the subject matter of Example 1 optionally includes wherein the target model comprises a first layer and a second layer, wherein generating the descriptor comprises using the first feature vector as input to the first layer.

In Example 3, the subject matter of Example 2 optionally includes wherein the operations further comprise training the target model using a plurality of target model training samples, the plurality of target model training samples comprising a second training sample comprising a second set of ordered strings, wherein the second training sample is associated with a label indicating a training descriptor associated with the second set of ordered strings.

In Example 4, the subject matter of any one or more of Examples 1-3 optionally includes wherein the first feature vector is based at least in part on an output of the first convolutional layer.

In Example 5, the subject matter of Example 4 optionally includes wherein the first convolutional layer comprises a one-dimensional feature filter, and wherein the first feature vector is based at least in part on convolving the one-dimensional feature filter and at least a portion of the input sample.

In Example 6, the subject matter of any one or more of Examples 4-5 optionally includes wherein the autoencoder language model comprises a second convolutional layer, wherein the operations further comprise generating a second feature vector using the input sample and the second convolutional layer of the autoencoder language model, wherein generating the descriptor of the input sample also uses the second feature vector.

In Example 7, the subject matter of Example 6 optionally includes wherein the target model comprises a first target model layer and a second target model layer, wherein generating the descriptor comprises: using the first feature vector and the second feature vector as input to the first target model layer: and using the first feature vector and the second feature vector as input to the second target model layer.

In Example 8, the subject matter of any one or more of Examples 1-7 optionally includes wherein the input sample comprises a first string, and wherein the descriptor comprises a key value describing the first string.

Example 9 is a method for analyzing text, the method comprising: training, by a computing device, an autoencoder language model using a plurality of language model training samples, the autoencoder language mode comprising a first convolutional layer, wherein a first language model training sample of the plurality of language model training samples comprising a first set of ordered strings comprising a masked string, a first string preceding the masked string in the first set of ordered strings, and a second string after the masked string in the first set of ordered strings; generating, by the computing device, a first feature vector using an input sample and the autoencoder language model; and generating, by the computing device, a descriptor of the input sample using a target model, the input sample, and the first feature vector.

In Example 10, the subject matter of Example 9 optionally includes wherein the target model comprises a first layer and a second layer, wherein generating the descriptor comprises using the first feature vector as input to the first layer.

In Example 11, the subject matter of Example 10 optionally includes training the target model using a plurality of target model training samples, the plurality of target model training samples comprising a second training sample comprising a second set of ordered strings, wherein the second training sample is associated with a label indicating a training descriptor associated with the second set of ordered strings.

In Example 12, the subject matter of any one or more of Examples 9-11 optionally includes wherein the first feature vector is based at least in part on an output of the first convolutional layer.

In Example 13, the subject matter of Example 12 optionally includes wherein the first convolutional layer comprises a one-dimensional feature filter, and wherein the first feature vector is based at least in part on convolving the one-dimensional feature filter and at least a portion of the input sample.

In Example 14, the subject matter of any one or more of Examples 12-13 optionally includes wherein the autoencoder language model comprises a second convolutional layer, further comprising generating, by the computing device, a second feature vector using the input sample and the second convolutional layer of the autoencoder language model, wherein generating the descriptor of the input sample also uses the second feature vector.

In Example 15, the subject matter of Example 14 optionally includes wherein the target model comprises a first target model layer and a second target model layer, wherein generating the descriptor comprises: using the first feature vector and the second feature vector as input to the first target model layer; and using the first feature vector and the second feature vector as input to the second target model layer.

In Example 16, the subject matter of any one or more of Examples 9-15 optionally includes wherein the input sample comprises a first string, and wherein the descriptor comprises a key value describing the first string.

Example 17 is a non-transitory machine-readable medium comprising instructions stored thereon that, when executed by at least one processor, cause the at least one processor to execute operations comprising: training an autoencoder language model using a plurality of language model training samples, the autoencoder language model comprising a first convolutional layer, wherein a first language model training sample of the plurality of language model training samples comprising a first set of ordered strings comprising a masked string, a first string preceding the masked string in the first set of ordered strings, and a second string after the masked string in the first set of ordered strings; generating a first feature vector using an input sample and the autoencoder language model; and generating a descriptor of the input sample using a target model, the input sample, and the first feature vector.

In Example 18, the subject matter of Example 17 optionally includes wherein the target model comprises a first layer and a second layer, wherein generating the descriptor comprises using the first feature vector as input to the first layer.

In Example 19, the subject matter of Example 18 optionally includes wherein the operations further comprise training the target model using a plurality of target model training samples, the plurality of target model training samples comprising a second training sample comprising a second set of ordered strings, wherein the second training sample is associated with a label indicating a training descriptor associated with the second set of ordered strings.

In Example 20, the subject matter of any one or more of Examples 17-19 optionally includes wherein the first feature vector is based at least in part on an output of the first convolutional layer.

Figure 7:
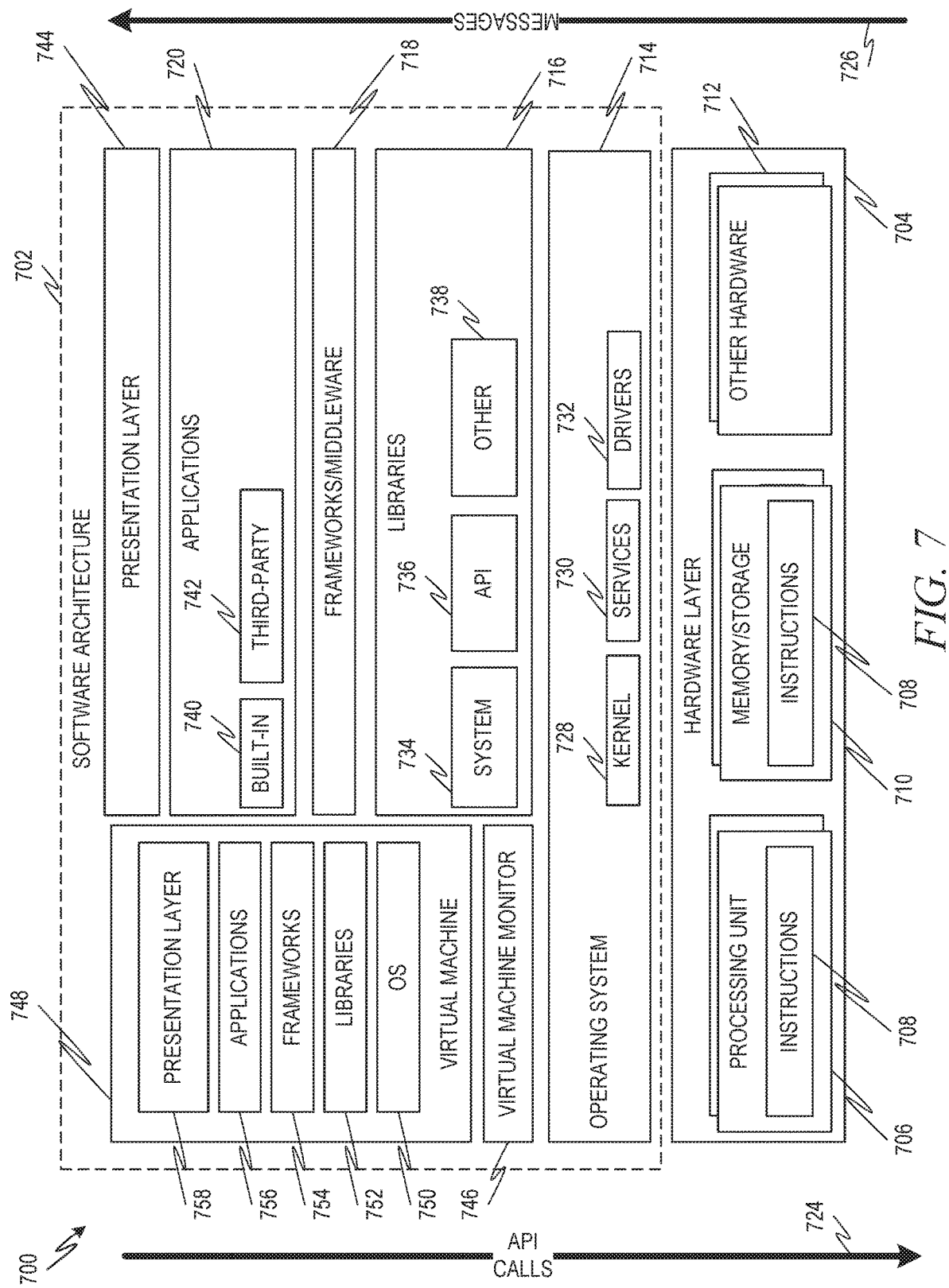
FIG. 7 is a block diagram showing one example of a software architecture for a computing device.

FIG. 7 is a block diagram 700 showing one example of a software architecture 702 for a computing device. The architecture 702 may be used in conjunction with various hardware architectures, for example, as described herein. FIG. 7 is merely a non-limiting example of a software architecture and many other architectures may be implemented to facilitate the functionality described herein. A representative hardware layer 704 is illustrated and can represent, for example, any of the above referenced computing devices. In some examples, the hardware layer 704 may be implemented according to the architecture of the computer system 800 of FIG. 8.

The representative hardware layer 704 comprises one or more processing units 706 having associated executable instructions 708. Executable instructions 708 represent the executable instructions of the software architecture 702, including implementation of the methods, modules, subsystems, and components, and so forth described herein and may also include memory and/or storage modules 710, which also have executable instructions 708. Hardware layer 704 may also comprise other hardware as indicated by other hardware 712, which represents any other hardware of the hardware layer 704, such as the other hardware illustrated as part of computer system 800.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720 and presentation layer 744. Operationally, the applications 720 and/or other components within the layers may invoke application programming interface (API) calls 724 through the software stack and access a response, returned values, and so forth illustrated as messages 726 in response to the API calls 724. The layers illustrated are representative in nature and not all software architectures have all layers. For example, some mobile or special purpose operating systems may not provide a frameworks/middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of an interrupt and, in response, cause the architecture 702 to pause its current processing and execute an interrupt service routine (ISR) when an interrupt is accessed.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 14D in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules. In some examples, libraries 716 may provide one or more APIs serviced by a message-oriented middleware.

The frameworks 718 (also sometimes referred to as middleware) may provide a higher-level common infrastructure that may be utilized by the applications 720 and/or other software components/modules. For example, the frameworks 718 may provide various graphic user interface (GUI) functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any of the built-in applications 740 as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 742 may invoke the API calls 724 provided by the mobile operating system such as operating system 714 to facilitate functionality described herein.

The applications 720 may utilize built-in operating system functions (e.g., kernel 728, services 730 and/or drivers 732), libraries (e.g., system 734, APIs 736, and other libraries 738), frameworks/middleware 718 to create user interfaces to interact with users of the system. Alternatively, or additionally, in some systems interactions with a user may occur through a presentation layer, such as presentation layer 744. In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware computing device. A virtual machine 748 is hosted by a host operating system (operating system 714) and typically, although not always, has a virtual machine monitor 746, which manages the operation of the virtual machine 748 as well as the interface with the host operating system (i.e., operating system 714). A software architecture executes within the virtual machine 748 such as an operating system 750, libraries 752, frameworks/middleware 754, applications 756 and/or presentation layer 758. These layers of software architecture executing within the virtual machine 748 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 8:
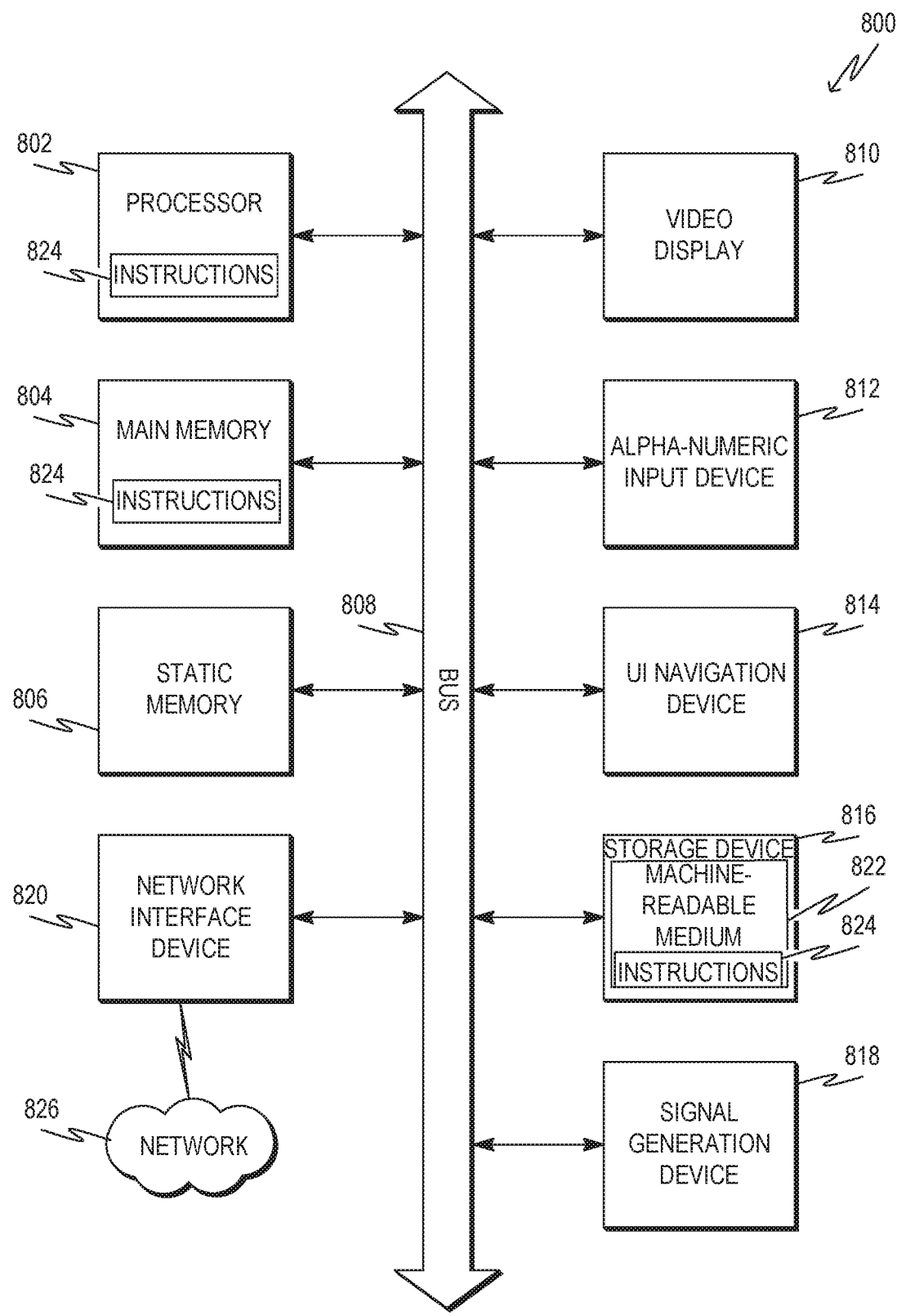
FIG. 8 is a block diagram of a machine in the example form of a computer system within which instructions may be executed for causing the machine to perform any one or more of the methodologies discussed herein.

FIG. 8 is a block diagram of a machine in the example form of a computer system 800 within which instructions 824 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation (or cursor control) device 814 (e.g., a mouse), a disk drive device 816, a signal generation device 818 (e.g., a speaker), and a network interface device 820.

Machine-Readable Medium

The disk drive unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media 822.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 824 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computerized system for analyzing text, the computerized system comprising:
    at least one programmable processor; and
    a machine-readable medium having instructions stored thereon that, when executed by the at least one programmable processor, cause the at least one programmable processor to execute operations comprising:
        training an autoencoder language model using a plurality of language model training samples, the autoencoder language model comprising a first convolutional layer, a first language model training sample of the plurality of language model training samples comprising a first set of ordered strings comprising a masked string, a first string preceding the masked string in the first set of ordered strings, and a second string after the masked string in the first set of ordered strings;
        generating a first feature vector using an input sample and the autoencoder language model; and
        generating a descriptor of the input sample using a target model, the input sample, and the first feature vector.

2. The computerized system of claim 1, wherein the target model comprises a first layer and a second layer, wherein generating the descriptor comprises using the first feature vector as input to the first layer.

3. The computerized system of claim 2, wherein the operations further comprise training the target model using a plurality of target model training samples, the plurality of target model training samples comprising a second training sample comprising a second set of ordered strings, wherein the second training sample is associated with a label indicating a training descriptor associated with the second set of ordered strings.

4. The computerized system of claim 1, wherein the first feature vector is based at least in part on an output of the first convolutional layer.

5. The computerized system of claim 4, wherein the first convolutional layer comprises a one-dimensional feature filter, and wherein the first feature vector is based at least in part on convolving the one-dimensional feature filter and at least a portion of the input sample.

6. The computerized system of claim 4, wherein the autoencoder language model comprises a second convolutional layer, wherein the operations further comprise generating a second feature vector using the input sample and the second convolutional layer of the autoencoder language model, wherein generating the descriptor of the input sample also uses the second feature vector.

7. The computerized system of claim 6, Wherein the target model comprises a first target model layer and a second target model layer, wherein generating the descriptor comprises:
    using the first feature vector and the second feature vector as input to the first target model layer; and
    using the first feature vector and the second feature vector as input to the second target model layer.

8. The computerized system of claim 1, wherein the input sample comprises a first string, and wherein the descriptor comprises a key value describing the first string.

9. A method for analyzing text, the method comprising:
    training, by a computing device, an autoencoder language model using a plurality of language model training samples, the autoencoder language mode comprising a first convolutional layer, a first language model training sample of the plurality of language model training samples comprising a first set of ordered strings comprising a masked string, a first string preceding the masked string in the first set of ordered strings, and a second string after the masked string in the first set of ordered strings;

generating, by the computing device, a first feature vector using an input sample and the autoencoder language model; and generating, by the computing device, a descriptor of the input sample using a target model, the input sample, and the first feature vector.

10. The method of claim 9, wherein the target model comprises a first layer and a second layer, wherein generating the descriptor comprises using the first feature vector as input to the first layer.

11. The method of claim 10, further comprising training the target model using a plurality of target model training samples, the plurality of target model training samples comprising a second training sample comprising a second set of ordered strings, wherein the second training sample is associated with a label indicating a training descriptor associated with the second set of ordered strings.

12. The method of claim 9, wherein the first feature vector is based at least in part on an output of the first convolutional layer.

13. The method of claim 12, wherein the first convolutional layer comprises a one-dimensional feature filter, and wherein the first feature vector is based at least in part on convolving the one-dimensional feature filter and at least a portion of the input sample.

14. The method of claim 12, wherein the autoencoder language model comprises a second convolutional layer, further comprising generating, by the computing device, a second feature vector using the input sample and the second convolutional layer of the autoencoder language model, wherein generating the descriptor of the input sample also uses the second feature vector.

15. The method of claim 14, wherein the target model comprises a first target model layer and a second target model layer, wherein generating the descriptor comprises:

using the first feature vector and the second feature vector as input to the first target model layer; and using the first feature vector and the second feature vector as input to the second target model layer.

16. The method of claim 9, wherein the input sample comprises a first string, and wherein the descriptor comprises a key value describing the first string.

17. A non-transitory machine-readable medium comprising instructions stored thereon that, when executed by at least one processor, cause the at least one processor to execute operations comprising:

training an autoencoder language model using a plurality of language model training samples, the autoencoder language model comprising a first convolutional layer, a first language model training sample of the plurality of language model training samples comprising a first set of ordered strings comprising a masked string, a first string preceding the masked string in the first set of ordered strings, and a second string after the masked string in the first set of ordered strings;

generating a first feature vector using an input sample and the autoencoder language model; and generating a descriptor of the input sample using a target model, the input sample, and the first feature vector.

18. The medium of claim 17, wherein the target model comprises a first layer and a second layer, wherein generating the descriptor comprises using the first feature vector as input to the first layer.

19. The medium of claim 18, wherein the operations further comprise training the target model using a plurality of target model training samples, the plurality of target model training samples comprising a second training sample comprising a second set of ordered strings, wherein the second training sample is associated with a label indicating a training descriptor associated with the second set of ordered strings.

20. The medium of claim 17, wherein the first feature vector is based at least in part on an output of the first convolutional layer.

* * * * *